United States Patent
Hua et al.

(10) Patent No.: US 11,686,496 B2
(45) Date of Patent: Jun. 27, 2023

(54) SYSTEMS AND METHODS FOR CHARACTERIZING VARIABLE-AIR-VOLUME (VAV) VALVES FOR USE IN HVAC SYSTEMS

(71) Applicant: Honeywell International Inc., Morris Plains, NJ (US)

(72) Inventors: Wei Hua, Acton, MA (US); Lloyd Nghi Trong Le, Braintree, MA (US); David Boisvert, North Chelmsford, MA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 548 days.

(21) Appl. No.: 16/836,020

(22) Filed: Mar. 31, 2020

(65) Prior Publication Data
US 2021/0302053 A1    Sep. 30, 2021

(51) Int. Cl.
| | |
|---|---|
| *F24F 11/74* | (2018.01) |
| *F24F 11/64* | (2018.01) |
| *F16K 37/00* | (2006.01) |
| *F24F 11/00* | (2018.01) |

(52) U.S. Cl.
CPC .......... *F24F 11/74* (2018.01); *F16K 37/0083* (2013.01); *F16K 37/0091* (2013.01); *F24F 11/0001* (2013.01); *F24F 11/64* (2018.01)

(58) Field of Classification Search
CPC ........ G05B 19/048; G05B 2219/24015; G05B 2219/49141; G05B 9/02
See application file for complete search history.

(56) References Cited

U.S. PATENT DOCUMENTS

| | | | |
|---|---|---|---|
| 4,108,371 A | 8/1978 | Leemhuis | |
| 4,917,174 A * | 4/1990 | Ring .................. | F24F 3/052 165/255 |

(Continued)

FOREIGN PATENT DOCUMENTS

| | | |
|---|---|---|
| CN | 109154406 A | 1/2019 |
| EP | 0819895 A2 | 1/1998 |

(Continued)

OTHER PUBLICATIONS

CN First Office Action, Chinese Patent Application No. 202110353154.9, Chinese Patent Office, Apr. 27, 2022 (12 pgs).

(Continued)

*Primary Examiner* — Kidest Bahta
(74) *Attorney, Agent, or Firm* — Seager, Tufte & Wickhem, LLP

(57) ABSTRACT

An HVAC system and method for characterizing a chosen VAV valve involves measuring the valve's volumetric flow rate versus valve position at just one or at some other limited number of data points and comparing that to the average characteristics a rather large group of similar valves. A custom characterization of airflow versus valve position for the chosen VAV valve is then created based on a difference between the characteristics of the chosen valve and that of the group of valves. In some examples, the VAV valve is of a venturi style such that a generic characterization of the group of valves is substantially linear when their flow rates are expressed logarithmically.

19 Claims, 10 Drawing Sheets

(56) References Cited

U.S. PATENT DOCUMENTS

| | | | |
|---|---|---|---|
| 4,928,750 A * | 5/1990 | Nurczyk | F24F 11/83 236/46 F |
| 5,479,812 A | 1/1996 | Juntunen et al. | |
| 6,549,826 B1 | 4/2003 | Pouchak et al. | |
| 7,653,459 B2 | 1/2010 | Pouchak et al. | |
| 2004/0249597 A1* | 12/2004 | Whitehead | F24F 11/62 702/118 |
| 2005/0173547 A1 | 8/2005 | George | |
| 2013/0068313 A1 | 3/2013 | George et al. | |
| 2014/0277773 A1 | 9/2014 | Goldschmidt et al. | |
| 2015/0057816 A1* | 2/2015 | Schick | G05D 7/0635 700/282 |
| 2017/0328756 A1* | 11/2017 | Chamberlain | F16K 37/0083 |

FOREIGN PATENT DOCUMENTS

| | | | |
|---|---|---|---|
| EP | 0819895 A3 | 8/1999 | |
| GB | 2238885 A | 12/1991 | |
| WO | 2019018513 A1 | 1/2019 | |

OTHER PUBLICATIONS

Extended European Search Report, EP Application No. 21163834.1, Sep. 8, 2021 (5 pgs).

CN Second Office Action, Chinese Patent Application No. 202110353154.9, Chinese Patent Office, Dec. 8, 2022 (9 pgs) (English translation.

* cited by examiner

SYSTEMS AND METHODS FOR CHARACTERIZING VARIABLE-AIR-VOLUME (VAV) VALVES FOR USE IN HVAC SYSTEMS

TECHNICAL FIELD

The disclosure relates generally to HVAC (Heating, Ventilating and/or Air Conditioning) systems, and more particularly to systems and methods for calibrating or characterizing VAV (Variable-Air-Volume) valves used in such HVAC systems.

BACKGROUND

HVAC systems (Heating, Ventilating, and/or Air Conditioning systems) often include VAV valves for regulating the amount of airflow through airducts that lead to various rooms or other areas of a building. VAV valves typically include a valve body movable within a tubular sheet metal housing or the like. The position of the valve body within the housing determines the valve's restriction to airflow and thus determines the amount of air flow that passes through the valve. A controller is often used to control some type of actuator to automatically adjust the valve body's position to achieve a desired air flow through the valve. In some cases, the controller operates in response to a feedback signal that provides an indication of the current position of the valve body.

SUMMARY

The present disclosure generally pertains to HVAC systems and more particularly to systems and methods for calibrating or characterizing VAV valves used in such HVAC systems. Some examples involve measuring the valve's flow rate versus valve position at just one or at some other limited number of data points and comparing that to an average, mean and/or other representation of valve flow rate versus valve position for a group of substantially similar valves. A custom characterization of airflow versus valve position for the chosen VAV valve may then be determined based on a difference between the measured characteristics of the chosen VAV valve and the flow characteristics of the group of VAV valves.

In some examples of the disclosure, a generic characterization of airflow versus valve position for the group of VAV valves is created prior to creating the custom characterization for the particular VAV Valve. The custom characterization is then created by shifting the generic characterization based on a difference between just two corresponding data points on the two characterizations.

In some examples of the disclosure, the volumetric flow rates of the generic and custom characterizations are converted to their $\log_{10}$ values. For some venturi type VAV valves, this may provide substantially linear versions of the generic and custom characterizations. More specifically, prior to characterizing the chosen VAV valve, the volumetric flow rates of the generic characterization are converted to their $\log_{10}$ values. This may provide a substantially linear version of the generic characterization. A similarly linear logarithmic custom characterization is created by shifting the generic characterization based on the difference between the chosen valve and the group of valves at just one or at some other limited number valve positions. In some examples of the disclosure, once the $\log_{10}$ version of the custom characterization is created, the custom characterization is converted back to an exponential relationship, which is then referenced in controlling the chosen VAV valve. In some examples of the disclosure, the VAV valve is of a pressure independent venturi style VAV valve, and may produce a substantially linear airflow to valve position relationship when the airflow is expressed in logarithmic terms.

The preceding summary is provided to facilitate an understanding of some of the features of the present disclosure and is not intended to be a full description. A full appreciation of the disclosure can be gained by taking the entire specification, claims, drawings and abstract as a whole.

BRIEF DESCRIPTION OF THE DRAWINGS

The disclosure may be more completely understood in consideration of the following description of various illustrative embodiments of the disclosure in connection with the accompanying drawings in which.

Figure 1A:
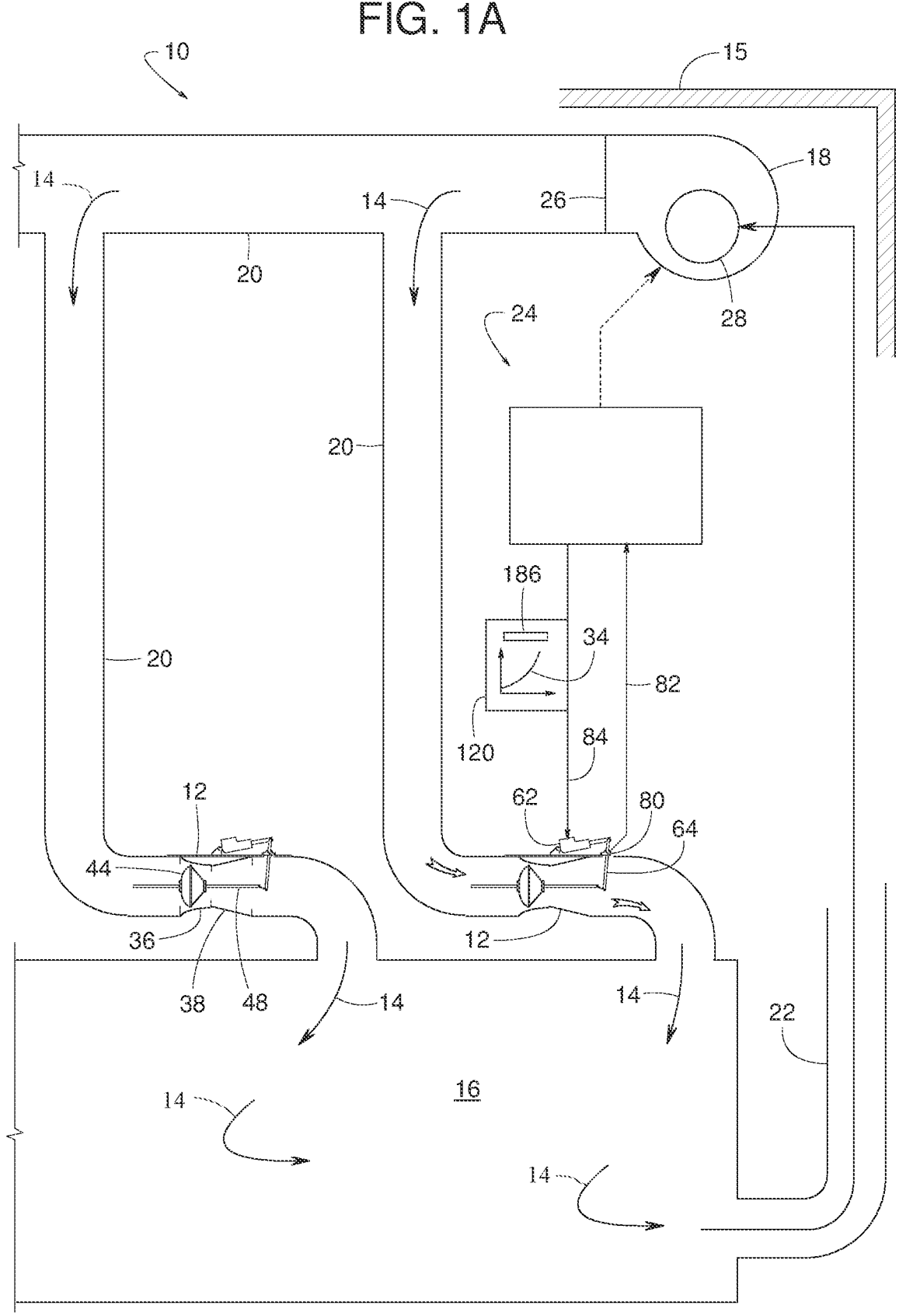
FIG. 1A is a schematic diagram of an example HVAC system.

While the disclosure is amendable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the disclosure.

In some examples, the disclosure pertains to characterizing a chosen VAV valve by measuring the valve's flow rate versus valve position at just one or at some other limited number of data points and comparing that to a generic characterization for the VAV valve that is based on, for example, an average characteristics of a rather large group of substantially similar VAV valves (e.g. same make/model), and then creating a custom characterization for the chosen VAV valve based on a difference between the characteristics of the chosen VAV valve and that of the group of VAV valves. This approach can significantly reduce the time needed to characterize the chosen VAV valve once the generic characterization has been generated and available for use. This may be particularly beneficial in a factory environment where each of the VAV valves is to be individually characterized before being shipped. This may also be beneficial when characterizing or re-characterizing a VAV valve in the field.

FIG. 1A shows an example HVAC system 10 with at least one VAV valve 12 (variable air volume valve) for delivering air 14 to a comfort zone 16 (e.g., a room, area or space within a building 15). The term, "HVAC system" refers to any apparatus or collection of devices used for heating, ventilating, cooling, filtering, humidifying, dehumidifying, blowing, compressing, regulating, and/or conveying air. The term, "VAV valve" refers to any device for adjusting or modulating airflow.

In this example, HVAC system 10 includes a blower 18, at least one supply airduct 20, a return airduct 22, at least one VAV valve 12, and a controller 24 (e.g., a computing system). Air 14 discharged from an outlet 26 of blower 18 flows through supply airduct 20, through one or more VAV valves 12, through comfort zone 16, through return airduct 22, and then back to a suction inlet 28 of blower 18 to perpetuate the cycle. Controller 24 controls the opening of each VAV valve 12 to adjust the amount of airflow delivered to comfort zone 16. The controller 24 may also control the blower 18 and/or one or more other HVAC components of the HVAC system 10.

The terms, "controller" and "computing system" each refer to a single component or a plurality of interacting components, wherein at least one of the components includes a computer readable medium 25 having stored thereon, in a non-transitory state, an executable program code 30 that, when executed, causes certain intended physical outcomes. Example controllers and computing systems include individual or various combinations of a computer 24', a computing device, a PLC, an electrical circuit, electromechanical relays, microprocessors, potentiometers, transducers, flow sensors, etc.

In some examples, VAV valve 12 is characterized prior to its actual use in HVAC system 10. The term, "characterize," as it applies to VAV valve 12, refers to a process for accurately determining an expected volumetric flow rate of air passing through the valve over a range of valve positions and/or over a range of feedback or control signals that vary as a function of valve position. In some but not all examples, the characterization process further considers static air pressure and/or other conditions of the air itself. Regardless of the actual static pressure at the valve, in some examples, the volumetric flow rate values are converted or normalized to standard atmospheric pressure.

In some examples, one or more specific VAV valves 12 are characterized by first measuring the performance of a plurality of test VAV valves 12' that are substantially the same (e.g. same make/model) as the specific VAV valve 12. This can be done prior to ever installing the specific VAV valve 12 in HVAC system 10. In some examples, the testing of the plurality of VAV valves 12' is done on a test stand 190 in a factory 4 (FIG. 1B) where valves 12 and 12' are manufactured. The resulting measurements of the plurality of test VAV valves 12' are basically averaged to create a generic characterization 32 that can be used for at least the initial control of a subsequently installed specific VAV valve 12. Generic characterization 32, (also referred to as a device specific characterization) shows the relationship of volumetric airflow versus valve opening for a group of test VAV valves 12' and may represent an average, mean or other representation of the volumetric airflow versus valve opening for the group of test VAV valves 12'.

Figure 1B:
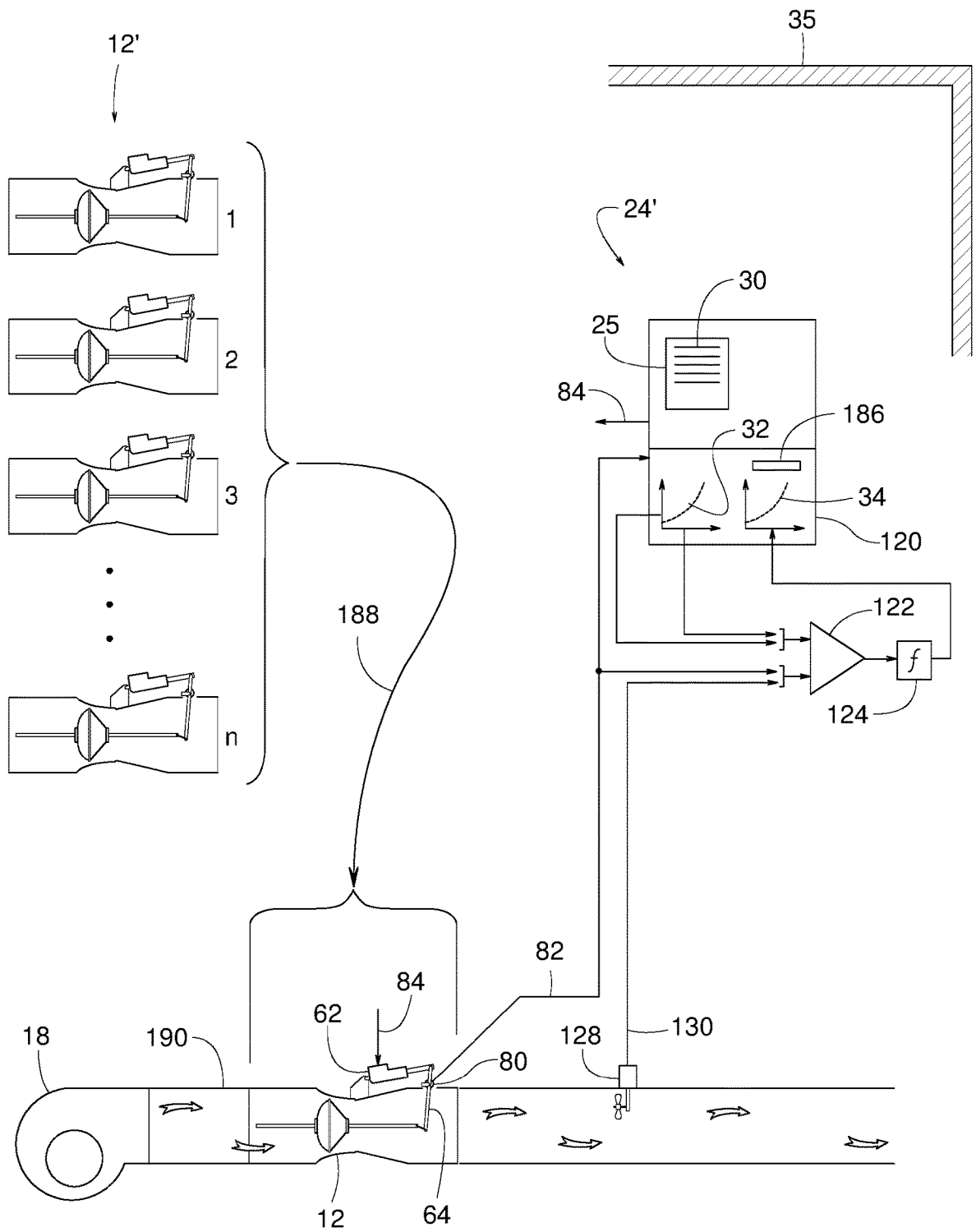
FIG. 1B is a schematic diagram of an example VAV valve test setup.

In the characterization process of a specific VAV valve 12, the airflow of the specific VAV valve 12 is measured for at least one valve position. In some examples, this also is done on test stand 190 in factory 35, as shown in FIG. 1B. Arrow 188 represents selectively installing VAV valve 12 and VAV valves 12' in test stand 190. In other examples, the testing of a specific VAV valve 12 can be done in building 15 (FIG. 1A) with the additional use of at least a temporarily installed flow sensor 128. In any case, the flow measurement(s) of the specific VAV valve 12 are compared to the generic characterization 32 at corresponding valve positions, and any deviation is used as a basis for creating a more accurate, custom characterization 34 of the specific VAV valve 12. Controller 24 subsequently uses the custom characterization 34 for accurately controlling the position of the specific VAV valve 12 once the specific VAV valve 12 is installed and operating in HVAC system 10, as shown in FIG. 1A.

While this characterization method can be applied to almost any type of VAV valve, the method may be particularly suitable for venturi-style VAV valves, such as VAV valves 12 shown in FIGS. 1-7. Venturi-style VAV valves are unique in that they may include mechanical elements for compensating for some variation in static pressure, and may include a curved funnel section 36 of variable pitch for providing a favorable valve position to flow rate relationship.

In the example shown in FIGS. 1-7, VAV valve 12 is of a venturi-style. Some specific examples of such a venturi-style VAV valve 12 include an Accel-2 Venturi valve by Phoenix Controls, a Supreme Air Venturi by EH Price, a Triatek valve, and a Venturi FX valve by Antec Controls.

Figure 2:
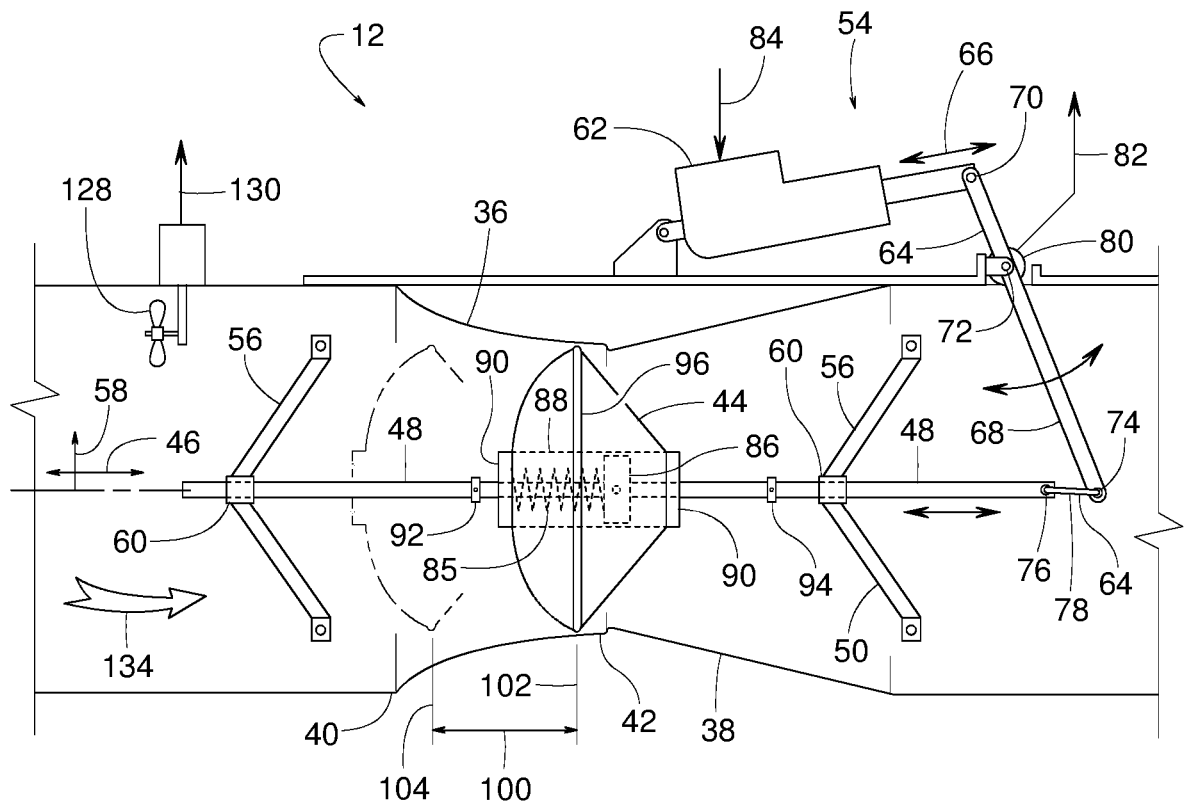
FIG. 2 is a schematic side view of an example VAV valve used in the HVAC system shown in FIG. 2, wherein a valve member of the VAV valve is shown in a position of a minimum airflow.

In some examples, and with reference to FIGS. 1 and 2, VAV valve 12 may include a housing 38 with a curved funnel section 36 extending between a broader upstream end 40 and a narrower downstream end 42, a valve member 44 movable in an axial direction 46 through funnel section 36, a shaft 48 (e.g., rod, bar, tube, etc.) extending through valve member 44, at least one bracket 50 attached to housing 38 for supporting shaft 48 and valve member 44, a valve seat 52 at the narrower downstream end 42 of funnel section 36, and an actuator system 54 for moving the position of valve member 44 within funnel section 36 to adjust a current of airflow 134 through VAV valve 12. Some examples of housing 38 are made of sheet metal formed in a generally tubular shape (e.g., round or rectangular cross-section); however, other examples of housing 38 are made of other materials and are not necessarily cylindrical.

In the illustrated example, bracket 50 includes a plurality of spoke-like arms 56 extending in a radial direction 58 between shaft 48 and an inner wall of housing 38. A hub-like central sleeve 60 of bracket 50 provides shaft 48 with radial support yet has sufficient clearance to allow actuator system 54 to slide shaft 48 in a axial direction 46 relative to sleeve 60 and housing 38. Shaft 48 is coupled to valve body 44, so actuator system 54 can move valve body 44 by moving shaft 48.

In some examples, actuator system 54 comprises an actuator 62 and a linkage 64. Linkage 64 mechanically couples actuator 62 to shaft 48. The term, "actuator" refers to any apparatus capable of moving valve member 44. Some examples of actuator 62 include an electric motor, a servo-motor, a stepper motor, a universal motor, a brushless DC motor, a linear motor, a pneumatic cylinder, a bellows, a drive screw, a roller chain, a cogged belt, a spring, and various combinations thereof, etc. The term, "linkage" refers to any structure capable of directly or indirectly transmitting a force 66 from actuator 62 to move valve member 44. Some examples of linkage 64 include a lever arm 68; one or more pivotal connections 70, 72, 74 and 76; a link 78 between lever arm 68 and shaft 48; a chain, a cable, a rod, a spring, and various combinations thereof.

In some examples, a position sensor 80 is operatively coupled to lever arm 68 of actuator system 54. Position sensor 80 provides controller 24 with a feedback signal 82 that indicates the position of valve member 44. With reference to feedback signal 82, controller 24 provides an output signal 84 that commands actuator 62 to move valve member 44 to various desired positions such as a commanded position.

The term, "position sensor" refers to any device for monitoring a movable member's location, wherein the device provides a feedback signal that varies in response to changes in the member's location, and thereby provides at least some indication of the member's position. Some examples of such movable members include linkage 64, actuator 62, shaft 48, valve member 44, etc. Some examples of position sensor 80 include a potentiometer coupled to lever arm 68 for sensing its angular position, an encoder, a resolver, a pulse counter, a Hall effect sensor, one or more electromechanical limit switches, a proximity sensor, etc.

In some examples, valve member 44 is rigidly attached to shaft 48, so the two move as a unit. In the illustrated example, however, valve member 44 is coupled to shaft 48 in a resiliently way that allows some limited axial movement between valve member 44 and shaft 48. Such movement allows valve member 44 to automatically shift its placement on shaft 48 in response to changes in static air pressure across valve member 44. This enables VAV valve 12 to automatically compensate for changes in static air pressure without actuator 62 having to make such corrections. So, under some varying pressure conditions (e.g., 0.3 to 3 inches static water column), actuator 62 and shaft 48 can remain substantially stationary while a change in static pressure automatically adjusts the position of valve member 44 to maintain a substantially constant volume of airflow through valve 12.

Such a pressure compensating valve design is shown in FIGS. 1-7. In the illustrated example, VAV valve 12 includes a spring 85, a spring collar 86, and a cylinder 88 disposed within valve member 44; two end caps 90 attached to valve member 44; an upstream collar 92 on shaft 48; and a downstream collar 94 on shaft 48. In some examples, valve member 44 includes a valve seal 96 that can seal upon valve seat 52 at the narrower downstream end 42 of funnel section 36.

Collars 92 and 94 are spaced apart and affixed to shaft 48. End caps 90 on valve member 44 are in slip-fit relationship with shaft 48. This provides valve member 44 with the freedom to slide axially along shaft 48 within the stopping limits of collars 92 and 94.

Spring 85 and spring collar 86 provide an axially resilient connection between valve member 44 and shaft 48. In the illustrated example, spring 85 is a compression spring with one end connected to one of the end caps 90. The spring's other end connects to spring collar 86. Cylinder 88 provides spring 85 with radial support. Spring collar 86 is affixed to shaft 48. Axial movement of shaft 48 is transmitted to spring collar 86, spring 85, and one end cap 90; so valve member 44 moves in response to movement of shaft 48.

In addition, the resilience of spring 85 provides valve member 44 with some freedom to move while shaft 48 is stationary. Such relative movement enables valve member 44 to slide along shaft 48 toward a more closed position in response to an increase in a delta static pressure across valve member 44. Conversely, valve member 44 can move toward a more open position in response to a decrease in delta static pressure. This in combination with the curved geometry of funnel section 36 allows VAV valve 12 to provide a substantially constant rate of airflow regardless of some changes of static pressure.

Under conditions of substantially constant static pressure, actuator system 54 can move valve member 44 to various positions, including those shown in FIGS. 2-6. FIG. 2 shows an approved operational airflow range 100 extending between a minimum airflow 102 and a maximum airflow 104.

The term, "approved operational airflow range" refers to a predetermined normal range of operation. As for minimum airflow 102 and maximum airflow 104, the terms, "minimum" and "maximum" refer to predetermined values and not necessarily absolute values. For example, the position of a valve can be adjusted over a predetermined approved range (normal operating range) between predetermined minimum and maximum positions, yet in some cases it is still possible to move the valve beyond the approved range, i.e., greater than the predetermined maximum or less than the predetermined minimum, but this is not required.

Figure 3:
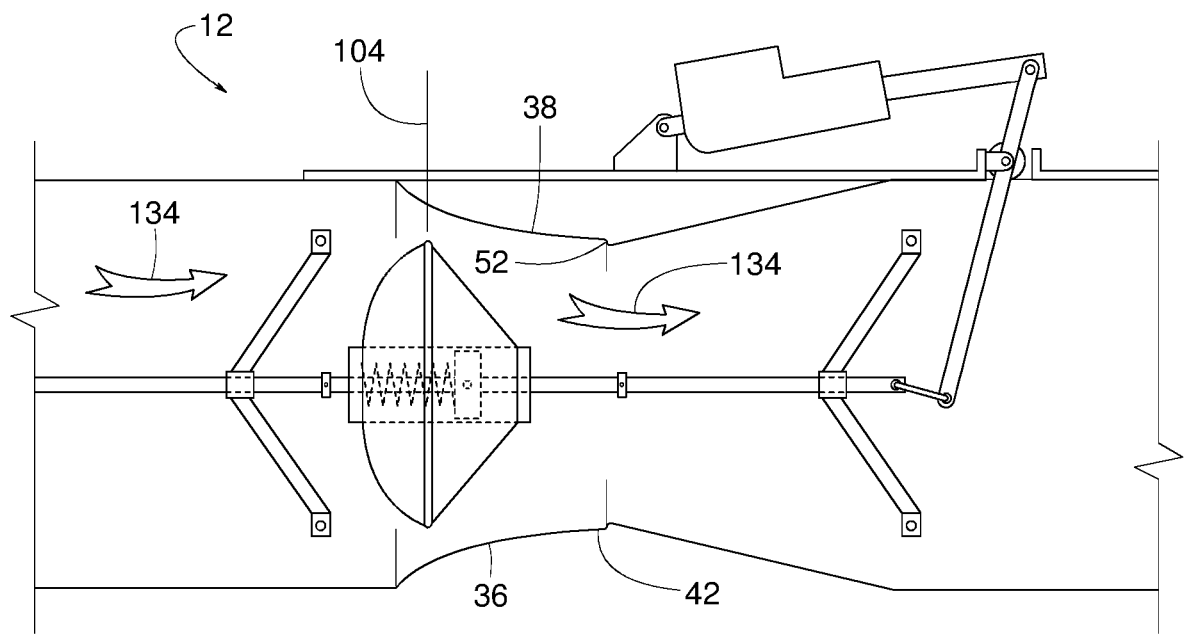
FIG. 3 is a schematic side view similar to FIG. 2 but showing the valve member in a position of a maximum airflow.

FIG. 2 shows actuator system 54 having moved valve member 44 to a position that configures VAV valve 12 for minimum airflow 102. FIG. 3 shows VAV valve 12 at maximum airflow 104.

Figure 4:
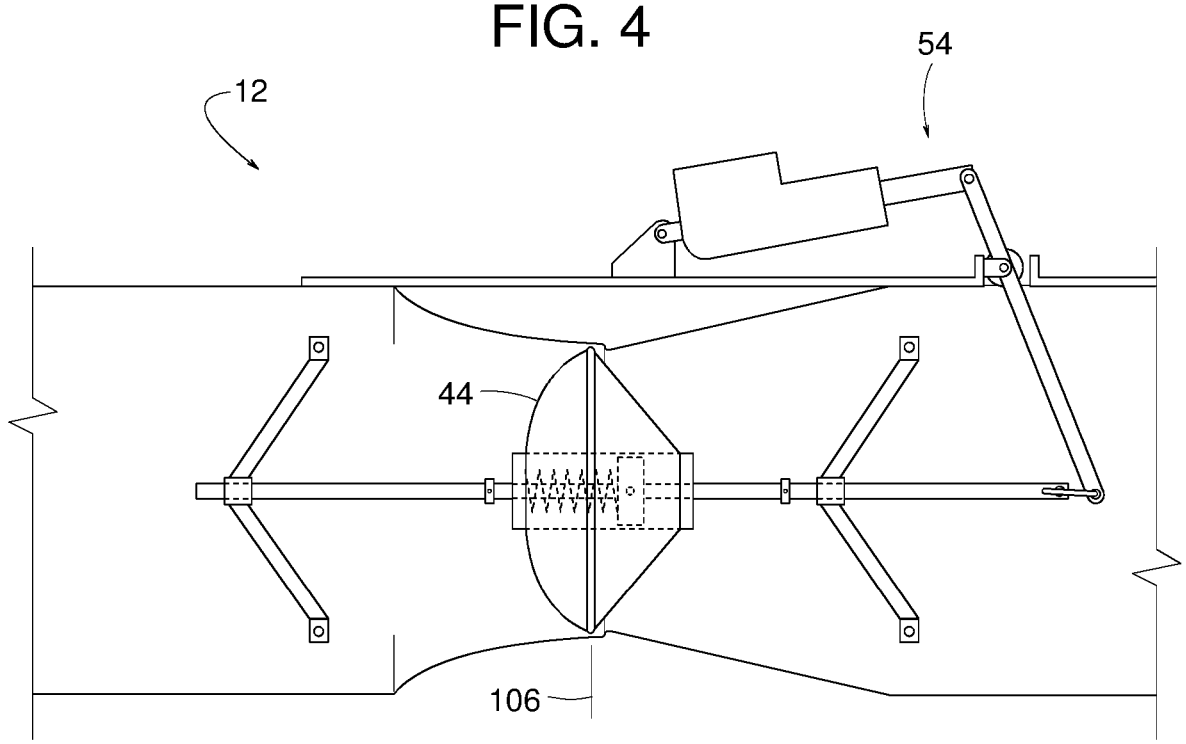
FIG. 4 is a schematic side view similar to FIG. 2 but showing the valve member at a minimum open position.

FIG. 4 shows actuator system 54 having moved valve member 44 to a minimum open position 106. In the illustrated example, minimum open position 106 is closer to being fully closed (FIG. 6) than when VAV valve 12 is configured for minimum airflow 102 (FIG. 2). So, in the example shown in FIG. 4, minimum open position 106 is less than the approved operational airflow range 100. In other examples, however, the minimum open position 106 is right at the minimum airflow 102 and thus is within the approved operational airflow range 100.

Figure 5:
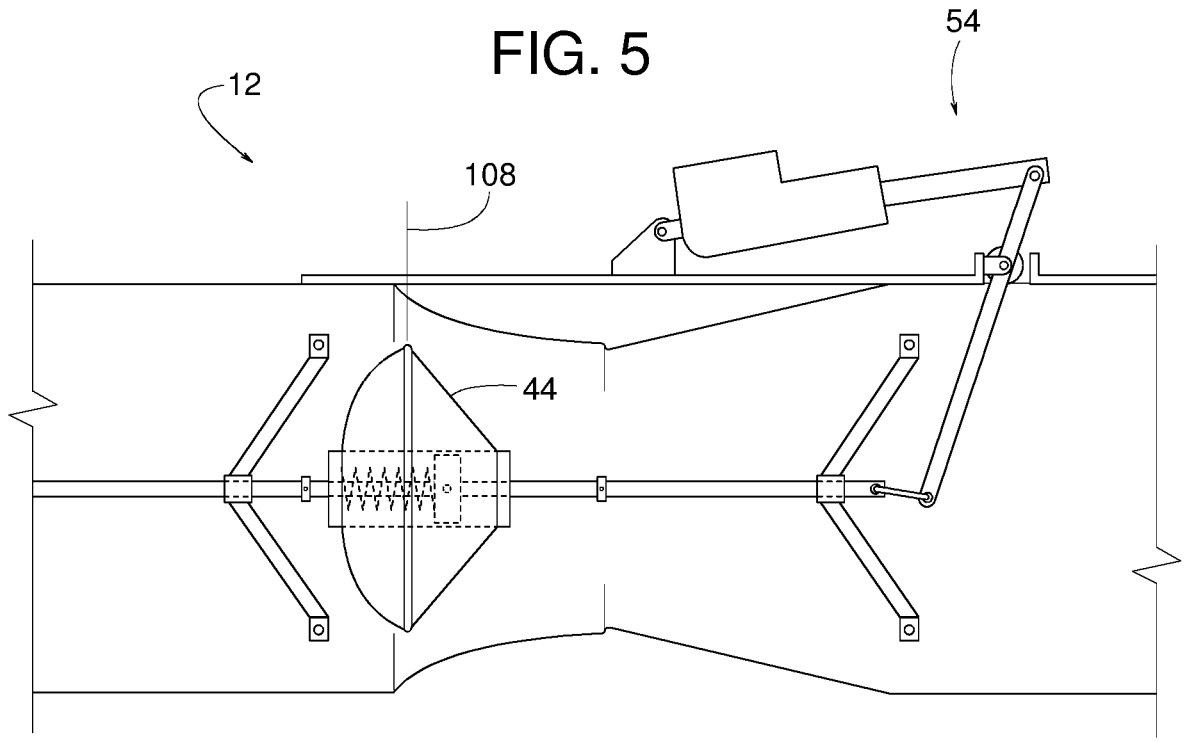
FIG. 5 is a schematic side view similar to FIG. 2 but showing the valve member at a maximum open position.

FIG. 5 shows actuator system 54 having moved valve member 44 to a maximum open position 108. In the illustrated example, maximum open position 108 is more open than when VAV valve 12 is configured for maximum airflow 104 (FIG. 3). So, in the example shown in FIG. 5, maximum open position 108 is beyond the approved operational airflow range 100. In other examples, however, maximum open position 108 is right at the maximum airflow 104 and thus is within the approved operational airflow range 100.

Figure 6:
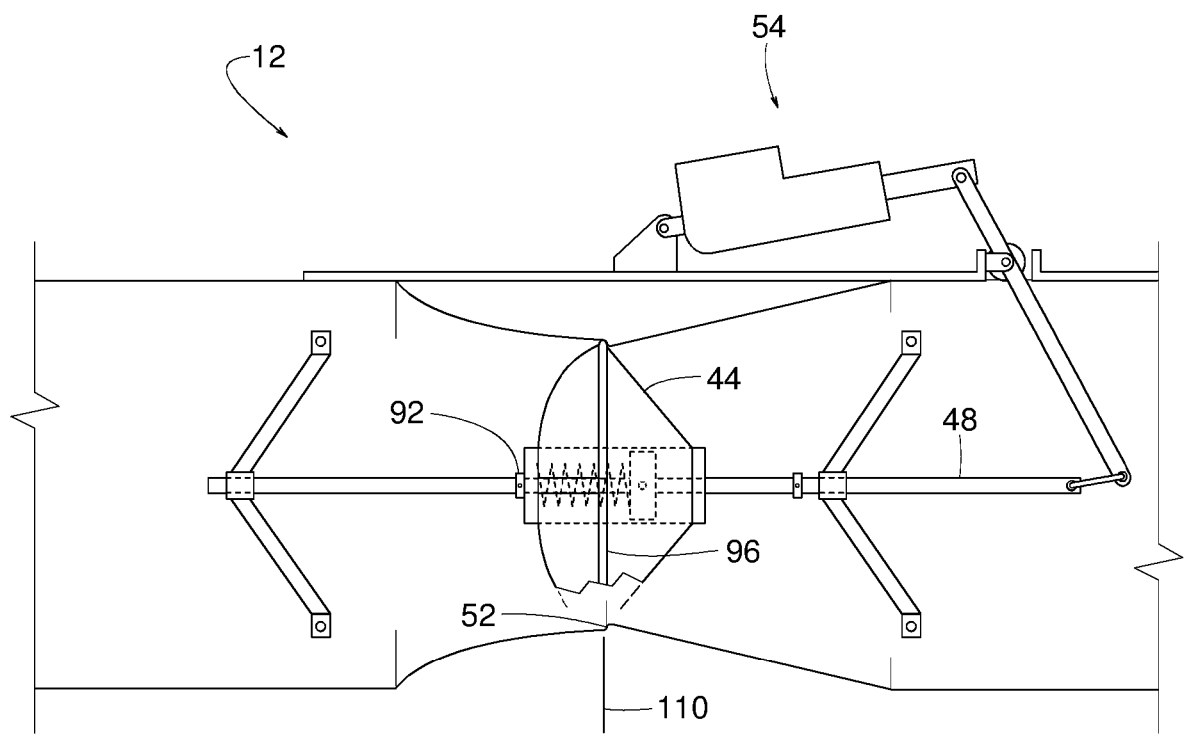
FIG. 6 is a schematic side view similar to FIG. 2 but showing the valve member at a fully closed position.

FIG. 6 shows actuator system 54 having moved valve member 44 to a fully closed position 110. In the illustrated example, valve seal 96 sealingly engages valve seat 52 when valve member 44 is at the fully closed position 110. In some examples, upstream collar 92 helps shaft 48 pull valve member 44 firmly up against valve seat 52.

Figure 7:
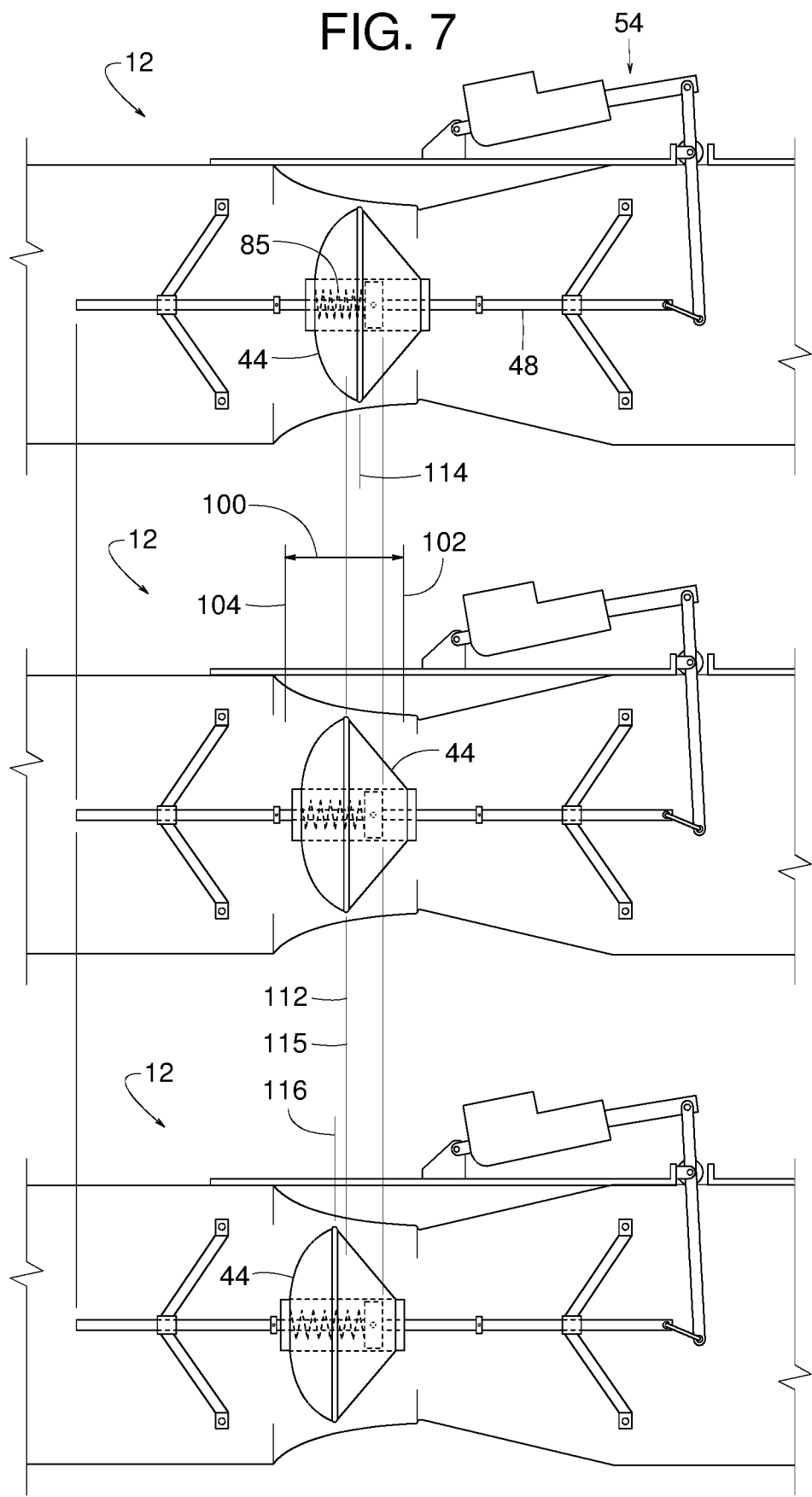
FIG. 7 is a set of three schematic diagrams each similar to FIG. 2 but showing the valve member's response to changes in static pressure.

FIG. 7 shows a set of three diagrams illustrating the movement of valve member 44 in response to changes in static pressure while actuator system 54 and shaft 48 remain stationary. In each of the diagrams, and for illustrative purposes only, valve member 44 is at a position that results in airflow that is at or near a midpoint 115 between minimum airflow 102 (FIG. 2) and maximum airflow 104 (FIG. 3). The middle diagram of FIG. 7 shows valve member 44 at one position 112 (e.g., midpoint 115) for providing a desired rate of airflow at a certain delta static air pressure across valve member 44. The top diagram of FIG. 7 shows spring 85 having moved valve member 44 to a more closed position 114 in response to an increase in delta static pressure so that VAV valve 12 still provides substantially the same rate of airflow even though the delta static pressure increased. The bottom diagram of FIG. 7 shows spring 85 having moved valve member 44 to a more open position 116 in response to a decrease in delta static pressure so that VAV valve 12 still provides substantially the same rate of airflow even though the delta static pressure decreased.

Figure 8:
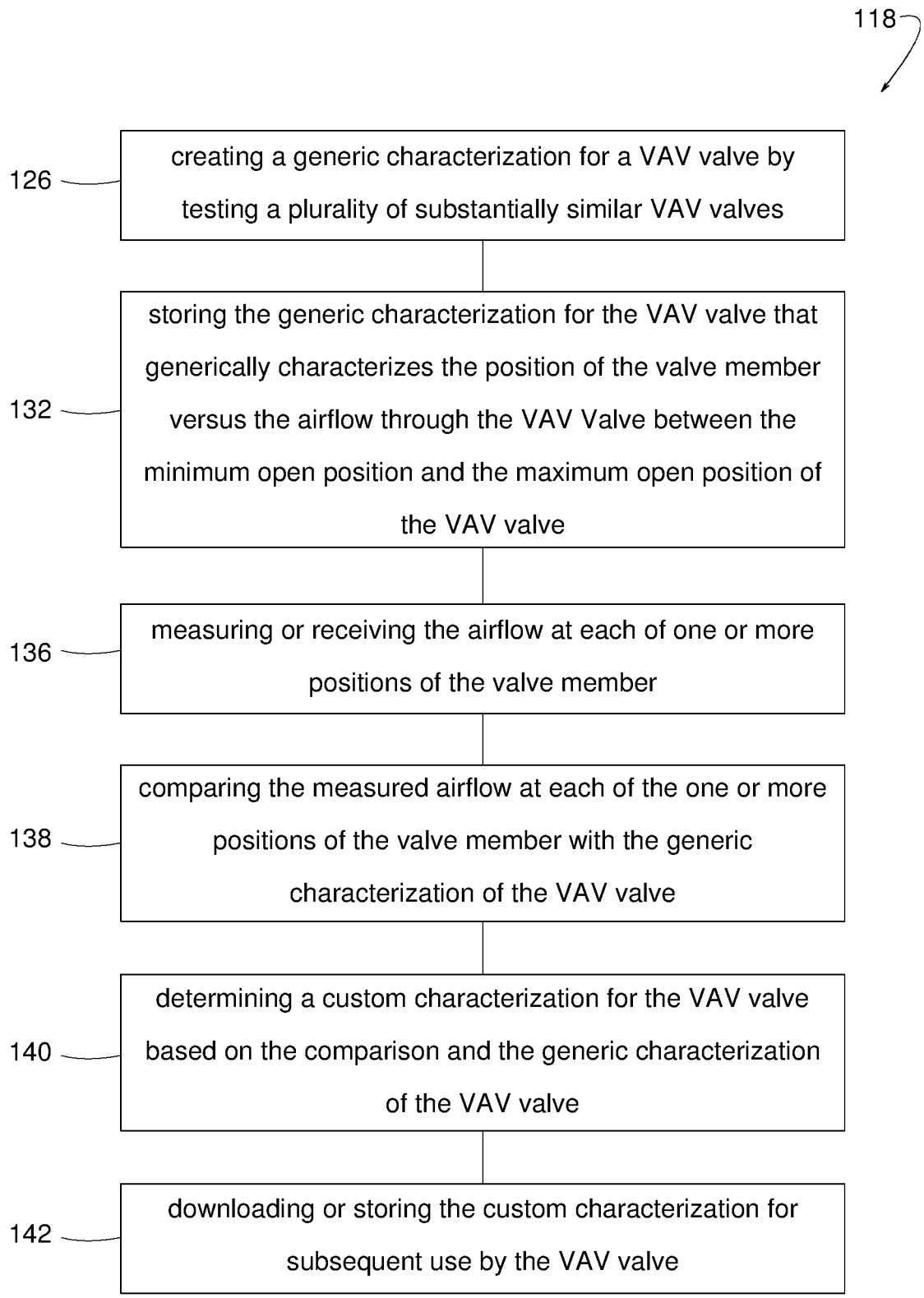
FIG. 8 is a flow diagram showing an example method for characterizing a VAV valve.

FIG. 8 illustrates an example method 118 for characterizing VAV valve 12. In some examples, at least some of the method steps shown in FIG. 8 are implemented by computer 24' or the like in the manufacturer's facility (e.g., factory 35 of FIG. 1B), and in some examples, may include computer readable medium 25 having stored thereon in a non-transitory state program code 30 for use by computer 24' to execute a method for characterizing VAV valve 12. The term, "computer readable medium" refers to any device for storing information for any duration (e.g., for extended time periods, permanently, for brief instances, for temporarily buffering, for caching of the information, etc). The term, "program code" refers to executable instructions (e.g., computer readable instruction, machine readable instructions, software, etc.). The term, "non-transitory computer readable medium" is specifically defined to include any type of computer readable storage device and/or storage disk and to exclude propagating signals and to exclude transmission media.

In some examples, other elements of computer 24'(FIG. 1B) may include a memory 120 for storing generic characterization 32 and/or for storing custom characterization 34, a comparator 132 for comparing the measured airflow at each of the one or more positions of valve member 44 with generic characterization 32, and a curve fitter 124 that, in some examples, helps in creating custom characterization 34.

In some examples, controller 24 (FIG. 1A) includes memory 120 for storing generic characterization 32 and/or for storing custom characterization 34. In other examples, memory 120 is part of a controller board (not explicitly shown) of VAV valve 12, and so the information of characterizations 32 and/or 34 stays with VAV valve 12.

In some examples, the manufacturer at factory 15 saves the device specific characterization (custom characterization 34) such that the stored information is linked to a serial number 186 or some other identifier of the particular VAV valve 12. Then, if the VAV valve 12 ever needs a replacement controller board, the manufacturer can deliver a new controller board with the device specific characterization already loaded.

In some examples, the device specific characterization (custom characterization 34) is done in the field, e.g., at building 15. In such a case, an installer or technician at building 15 would use a temporarily installed flow sensor 128, or some other suitable method, for taking one or more flow readings through VAV valve 12. The technician would input the flow reading and corresponding valve member position into a specialized tool (e.g. smartphone, digital pad, laptop, etc.). The specialized tool then generates the device specific characterization (custom characterization 34) and uploads the device specific characterization to the controller board of the specific VAV valve 12.

In some example methods, a block 126 of FIG. 8 represents creating a generic characterization 32 (FIG. 9) for VAV 12 by testing a plurality of virtually identical or substantially similar VAV valves 12' (FIG. 1B). The number of valves 12' can range from just a few to over a thousand or even hundreds of thousands. Each valve 12' is tested to measure its volumetric flow rate versus valve position. This is done over a plurality of valve positions and at a certain delta static pressure. In some examples, the number of readings is 47 for each valve 12', but really any reasonable number of valve positions can be tested, depending on the desired accuracy of the resulting generic characterization 32. This is typically done by the manufacturer in factory 35 (FIG. 1B).

Airflow measuring device 128 (FIG. 1B) for measuring airflow is schematically illustrated to represent any apparatus for directly or indirectly determining the volumetric flow rate of air passing through a VAV valve. Some examples of airflow measuring device 128 include an anemometer, an air pressure sensor, a pitot tube, a manometer, and pluralities and combinations thereof. In some examples, airflow measuring device 128 is an anemometer providing a volumetric airflow reading 130. Reading 130 can be in any scale, units and format such as, for example, in cubic feet per minute normalized to standard atmospheric pressure.

Position sensor 80 can be used for measuring valve position. In the illustrated example, position sensor 80 is a potentiometer (FIG. 16) coupled to lever arm 68. Position sensor 80 senses the angular position of lever arm 68, and thus senses the movement of shaft 48, which determines the position of valve member 44 for a given delta static air pressure. The position sensor's feedback signal 82 thus indicates the position of valve member 44 for a given delta static air pressure.

Feedback signal 82 can be in any scale, units and format such as, for example, in units of volts (e.g., 0-2 volts, 0-10 volts, 1-10 volts, etc.). In some examples, an offset voltage is subtracted from the actual feedback signal's value, wherein the offset sets the feedback signal's value to zero at the valve member's fully closed position. In some examples, feedback signal 82 in units of volts is converted to actual valve position. In such examples, generic characterization 32 is in a format of valve member position versus airflow.

Values of feedback signal 82 from position sensor 80 and readings 130 from airflow measuring device 128 provide the coordinates or data points of generic characterization 32. Generic characterization 32 can be plotted graphically (FIG. 9), tabulated in a chart format (FIG. 13), and/or expressed as an equation (e.g., airflow varying as a function of valve position).

Referring back to FIG. 8, block 132 represents storing generic characterization 32 for VAV valve 12 that generically characterizes the position of valve member 44 versus airflow 134 through VAV valve 44 between the minimum open position 106 (FIG. 4) and the maximum open position 108 (FIG. 5) of VAV valve 12. In some examples, as mentioned earlier, controller 24 includes memory 120 (FIG. 1A) for storing generic characterization 32 and/or for storing custom characterization 34. In other examples, memory 120 is part of an onboard controller board of VAV valve 12.

As mentioned earlier, in some examples, generic characterization 32 is empirically derived based on the average flow versus valve position readings of the plurality of VAV valves 12'. Controller 24 makes reference to generic characterization 32 as a means for initially controlling a specific VAV valve 12 until a more accurate custom characterization 34 of valve 12 can be developed during the process of later characterizing VAV valve 12 itself.

A block 136 of FIG. 8 represents measuring airflow 134 (e.g., via flow sensor 128) at each of one or more positions of valve member 44 of VAV valve 12. In some examples, airflow 134 is measured at only one valve position, such as at maximum open position 108 (FIG. 5) and/or at maximum airflow 104 (FIG. 3). This can suffice in examples where airflow 134 at the minimum open position 106 (FIG. 4) or at minimum airflow 102 (FIG. 2) is substantially the same for VAV valves 12 and 12'. In some examples, a more accurately derived custom characterization 34 is achieved when the single airflow measurement is taken at a little above the approved operational airflow range 100, e.g., at maximum open position 108 (FIG. 5) rather than at maximum airflow 104 (FIG. 3).

In some examples, airflow 134 is measured at just two positions (less than three positions), one at or near each opposite end of approved operational airflow range 100. For example, a first measurement can be taken at the maximum open position 108 (FIG. 5) and/or at maximum airflow 104 (FIG. 3), and a second measurement can be taken at the minimum open position 106 (FIG. 4) and/or at minimum airflow 102 (FIG. 2). In some examples, minimum open position 106 (FIG. 4) coincides with minimum airflow. Likewise, in some examples, maximum open position 108 (FIG. 5) coincides with maximum airflow. In some examples, however, a more accurately derived custom characterization 34 may be achieved when the two airflow measurements are taken a little beyond the approved operational airflow range 100 (e.g., at minimum open position 106 of FIG. 4 and at maximum open position 108 of FIG. 5).

In addition or alternatively, in some examples, airflow 134 is measured somewhere above a midpoint 115 (FIG. 7) between the minimum airflow (FIG. 2) and the maximum airflow (FIG. 3) of the approved operational airflow range 100. In examples where the above-midpoint reading is taken in addition to taking higher and lower point readings, the total of three measurements (less than five) can result in greater accuracy of custom characterization 34. In examples where the above-midpoint reading is the only measurement taken, it has been discovered that such an above-midpoint reading may result in satisfactory accuracy of custom characterization 34.

A block 138 of FIG. 8 represents comparing measured airflow 134 at each of the one or more positions of valve member 44 of VAV valve 12 with the generic characterization 32 of at least one of VAV valves 12'. The purpose of the comparison is to identify any deviation between generic characterization 32 and the actual performance of VAV valve 12. In some examples, such a comparison is performed by comparator 122 (FIG. 1B).

A block 140 of FIG. 8 represents determining or creating custom characterization 34 for VAV valve 12 based on the comparison in block 138 and the generic characterization 32 of VAV valve 12, wherein generic characterization 32 of VAV valve 12 was obtained through testing of one or more VAV valves 12'. In some examples, curve fitter 124 can be used in helping create custom characterization 34.

A block 142 of FIG. 8 represents storing custom characterization 34 for subsequent use in the control of VAV valve 12. In some examples, as shown in FIG. 1A, memory 120 of controller 24 is used for storing custom characterization 34.

Figure 9:
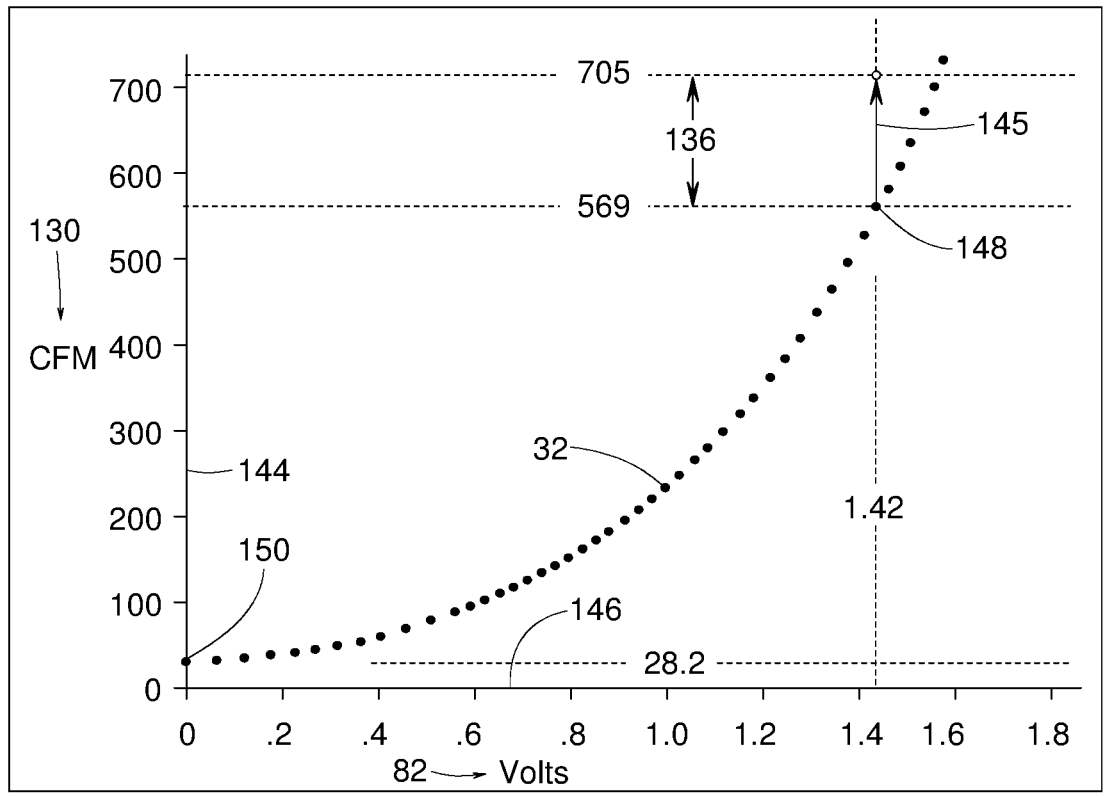
FIG. 9 is a graph showing a generic characterization of a group of VAV valves.

FIGS. 9-12 show example graphical depictions of generic characterization 32 and/or custom characterization 34. More specifically, FIG. 9 shows generic characterization 32 as a plot of CFM on Y-axis 144 versus Volts on X-axis 146. CFM is the volumetric rate of air flowing through VAV valve(s) 12' in units of cubic feet per minute (normalized at standard pressure). CFM on Y-axis 144 is the same as or derived from reading 130 as provided by flow sensor 128. Volts is the value of feedback signal 82 of position sensor 80 of VAV valve(s) 12'. In the illustrated example, flow measurements were taken at 47 data points for each of VAV valves 12'. Generic characterization 32 is an average or summary of the test results.

In this particular example, generic characterization 32 shows the average VAV valve 12' conveys 569 CFM when the position of their valve member 44 results in the position sensor's feedback signal 82 being at 1.42 volts. VAV valve 12' conveys about 28.2 CFM for a feedback signal 82 of zero volts. As mentioned earlier, an offset is applied to feedback signal 82 such that feedback signal 82 is at zero volts when valve member 44 is at its minimum open position 106 (FIG. 4).

FIG. 9 also shows that when position sensor 80 of some chosen VAV valve 12 provides a feedback signal 82 of 1.42 volts, the chosen VAV valve 12 actually conveys 705 CFM. Consequently, generic characterization 32 alone would be an inaccurate reference for positioning the chosen VAV valve 12. Nonetheless, generic characterization 32 can be used for positioning valve member 44 of VAV valve 12 at least initially during testing for the purpose of custom characterizing VAV valve 12.

Figure 10:
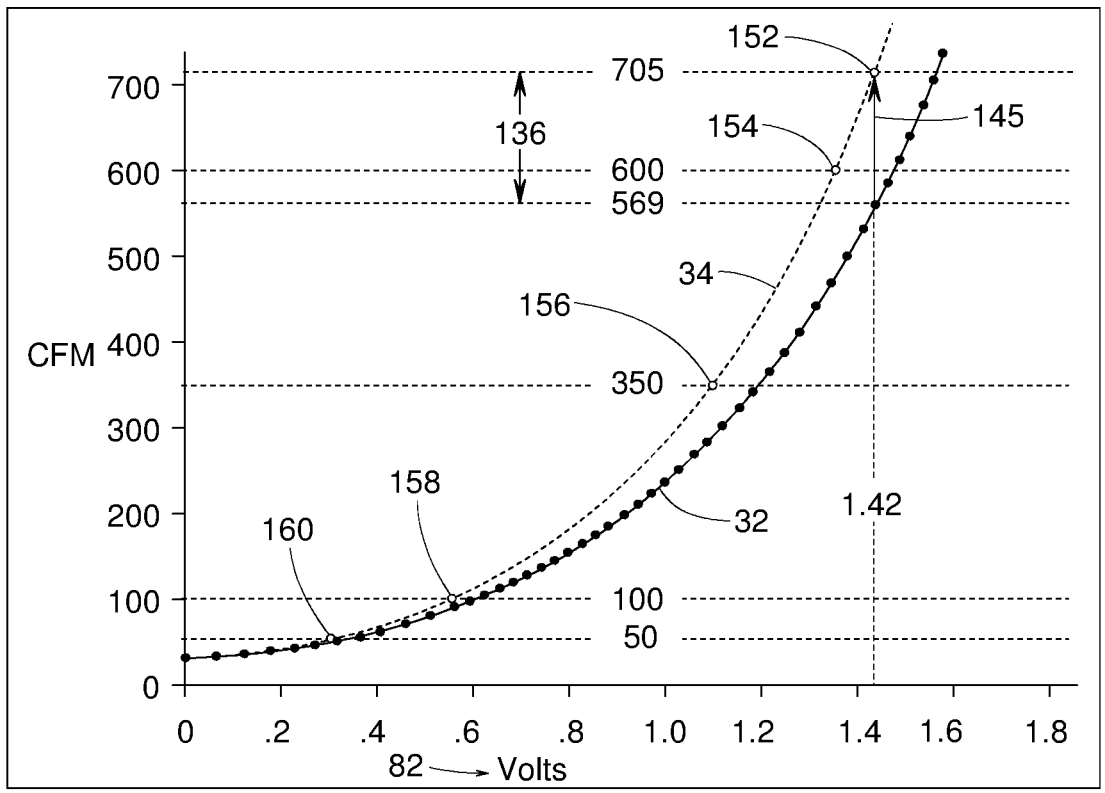
FIG. 10 is a graph showing how the generic characterization of FIG. 9 can be shifted to create a custom characterization for a specific VAV valve.

FIG. 10 shows a more accurate custom characterization 34 of VAV valve 12. Custom characterization 34 can be achieved by various means. In a first example, the right side (at 1.42 volts) of generic characterization 32 is skewed or shifted 145 upward by 136 CFM (705−569), while the left side (at zero volts) of generic characterization 32 is left as is. This may suffice in examples where VAV valves 12 and 12' have substantially the same airflow at zero volts.

Additional accuracy can be achieved by taking flow readings at one or more additional points. FIG. 10, for example, shows one or more additional readings taken at 600 CFM, 350 CFM, 100 CFM and/or 50 CFM. With multiple data points, curve fitter 124 can apply known curve fitting methods to find a best-fitting curve to represent custom characterization 34.

It has been discovered, however, that a surprisingly accurate custom characterization 34 can be quickly identified by first converting generic characterization 32 to a logarithmic scale, such as log base 10 ($\log_{10}$). Log base 10 has been found to work particularly well for two reasons. One, generic characterization 32 and custom characterization 34, in some examples, are almost perfectly linear in $\log_{10}$. And two, the flow reading at minimum airflow in $\log_{10}$, in some examples, is very close to being the same for both characterizations 32 and 34. Consequently, in some examples, custom characterization 34 in $\log_{10}$ can be readily generated by merely tilting generic characterization 32 (in log base 10)

about the minimum airflow point at zero volts. A single point reading at the maximum open position 108 (FIG. 5) or at maximum airflow 104 (FIG. 3) can thus suffice in determining how far to tilt generic characterization 32 to achieve custom characterization 34.

Figure 11:
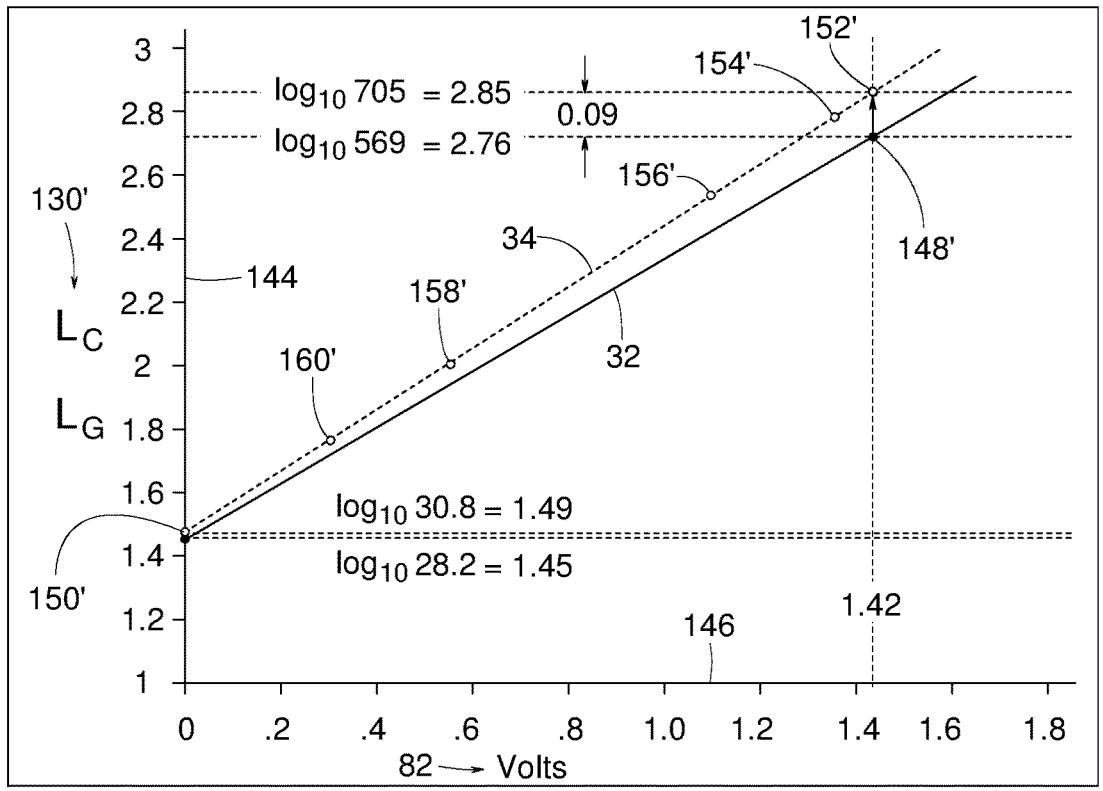
FIG. 11 is a graph similar to FIG. 10 but showing the characterizations with airflow expressed logarithmically.

FIG. 11 shows generic characterization 32 after conversion to log base 10. In FIG. 11, generic characterization 32 is plotted as "L" 130' (e.g., $L_G$ and $L_C$) on Y-axis 144 versus Volts on X-axis 146. "L" 130' in FIG. 11 is the $\log_{10}$ of CFM 130 in FIGS. 9 and 10.

Data point 148 in FIG. 9, for example, corresponds to data point 148' in FIG. 11. At point 148 in FIG. 9, CFM is 569. At corresponding point 148' in FIG. 11, $L_G$ is 2.76 ($\log_{10} 569 = 2.76$).

Likewise, data point 150 in FIG. 9 corresponds to point 150' in FIG. 11. At point 150 in FIG. 9, CFM is 28.2. At corresponding point 150' in FIG. 11, L is 1.45 ($\log_{10} 28.2 = 1.45$).

Points 152, 154, 156, 158 and 160 of FIG. 10, correspond respectively to points 152', 154', 156', 158' and 160' of FIG. 11. At points 150 and 150', a CFM of 705 corresponds to an $L_C$ of 2.85 ($\log_{10} 705 = 2.85$). At points 160 and 160', a CFM of 50 corresponds to an $L_C$ of 1.70 ($\log_{10} 50 = 1.70$). At a valve position of zero volts, flow through the chosen VAV valve 12 was measured to be 30.8 CFM, which corresponds to an $L_C$ of 1.49 ($\log_{10} 30.8 = 1.49$). When comparing the chosen VAV valve 12 to VAV valve(s) 12', the difference in L at a valve position of zero volts is merely 0.04 (1.49−1.45). So, in some examples, custom characterization 34, as shown in FIG. 11, can be created by simply tilting generic characterization 32 upward about the zero-volt data point. In the illustrated example, generic characterization 32 is tilted upward by raising point 148' from an $L_G$ of 2.76 to 2.85 (a ΔL of 0.09), thereby creating custom characterization 34, as shown in FIG. 11.

Figure 12:
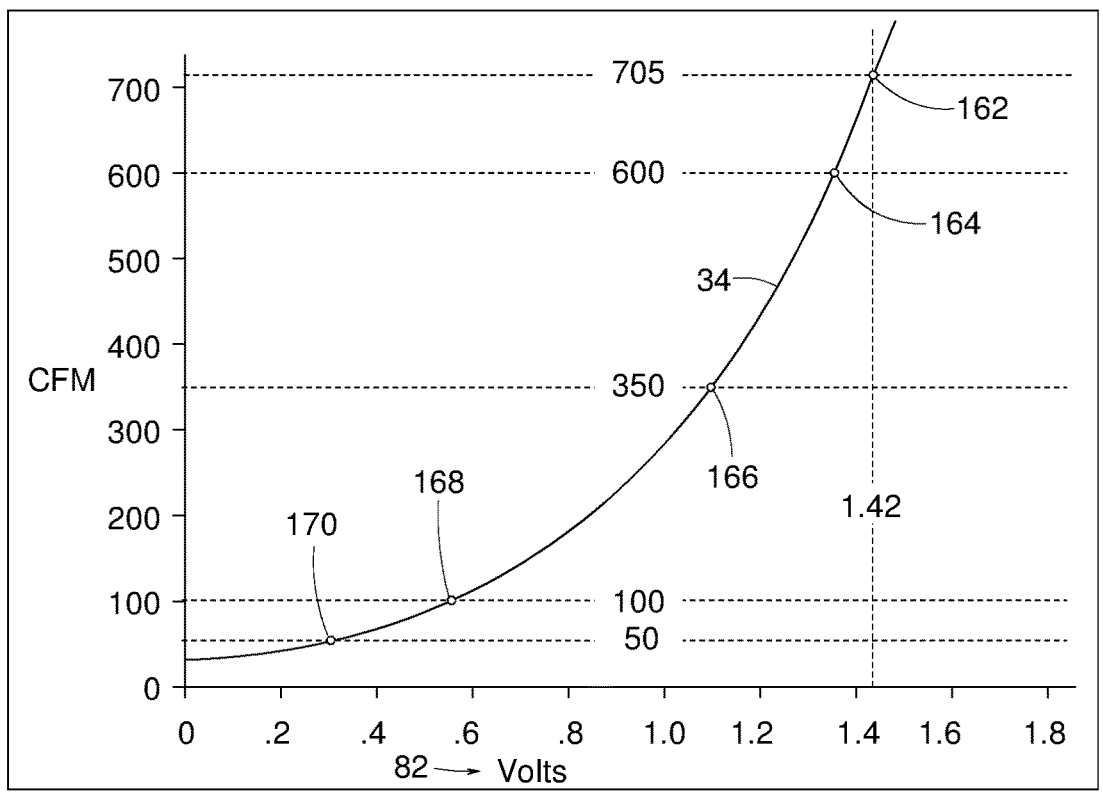
FIG. 12 is a graph showing the custom characterization of a specific valve, wherein the custom characterization is created by shifting a generic characterization with airflow expressed either normally (FIG. 10) or logarithmically (FIG. 11)

In some examples, custom characterization 34 is used in its logarithmic format (FIG. 11) for controlling VAV valve 12. In some examples, custom characterization 34 in its logarithmic format of FIG. 11 is first converted to a normal linear scale, as shown in FIG. 12, before being used for controlling VAV valve 12. Points 162, 164, 166, 168 and 170 of FIG. 12 correspond respectively to points 152', 154', 156', 158' and 160' of FIG. 11.

Figure 13:
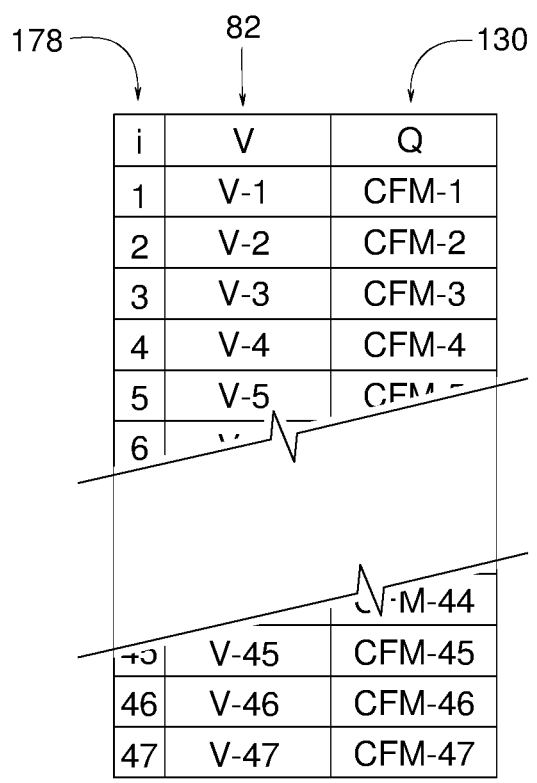
FIG. 13 is a chart illustrating another format of storing a generic and/or custom characterization.

In some examples, custom characterization 34 can be stored in a lookup table 172, as shown in FIG. 13. In the illustrated example of lookup table 132, "V" refers to feedback signal 82 in units of volts, "Q" refers to flow rate reading 130 (e.g., in CFM), and "i" refers to incremental data points 178 of Q versus V.

Figure 14:
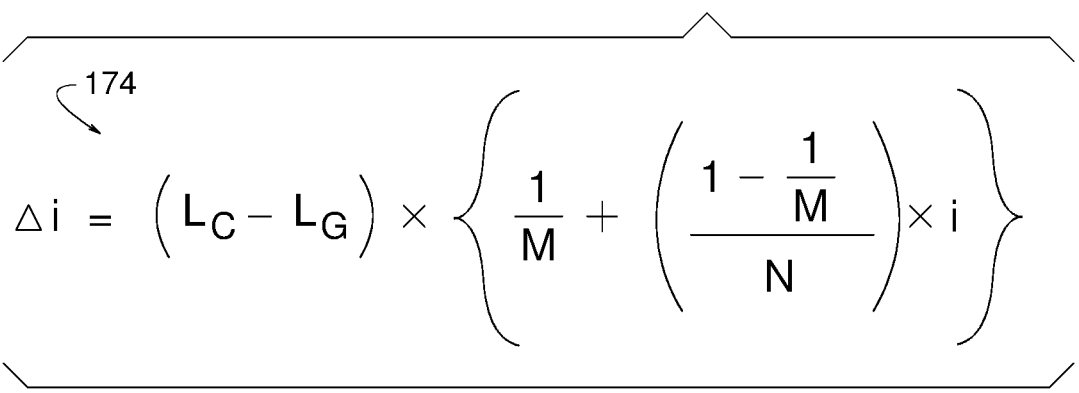
FIGS. 14-15 show illustrative formulas defining a relationship of variables and constants pertaining to generic and custom characterizations.
Figure 15:
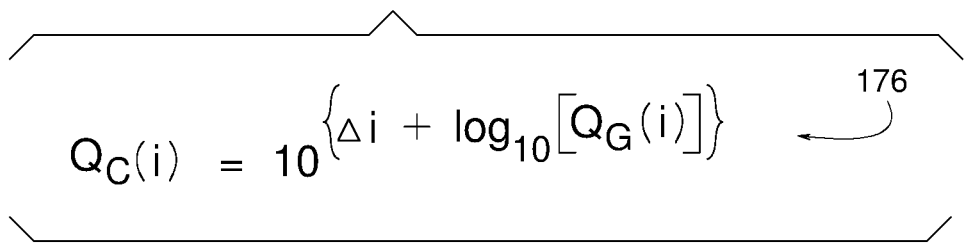

In addition or alternatively to the formats shown in FIGS. 10, 11, 12 and 13, some examples of custom characterization 34 are expressed as one or more formulas 174 and 176, as shown in FIGS. 14 and 15. In formulas 174 and 176, "i" refers to the series of incremental data points 178. In the illustrated example, incremental data points 178 are integers from 1 to 47. $L_C$ refers to the $\log_{10}$ value of $Q_C$ of a particular VAV valve 12 at the various incremental data points 178. $L_G$ refers to the $\log_{10}$ value of $Q_G$ of VAV valve(s) 12' at incremental data points 178. "N" refers to the value of "i" or the specific data point 178 where valve member 44 is at its maximum open position 108 (FIG. 5) or at maximum airflow 104 (FIG. 3). In the illustrated example, "N" is 42.

"M" refers to an empirically derived maximum adjustment constant and can be of any suitable value that fits. The value "M" can be considered a measure of how parallel custom characterization 34 is to generic characterization 32 when the airflow of the two characterizations are expressed logarithmically, as shown in FIG. 11. Relatively low values of "M" are used in examples where there is a relatively low discrepancy between the airflow of the chosen VAV valve 12 and the airflow of the group of VAV valves 12' at their minimum open position 106 (FIG. 4) or minimum airflow 102 (FIG. 2). In some examples, "M" is 2.5. In other examples, "M" is 1.9. In the example illustrated in FIG. 11, "M" is 1.01. The term, "delta-i" or Δi refers to an incremental change of "i". $Q_G(i)$ refers to the flow rate in CFM of VAV valve(s) 12' at each incremental data point 178. $Q_C(i)$ refers to the flow rate in CFM of a particular VAV valve 12 at each incremental data point 178.

Figure 16:
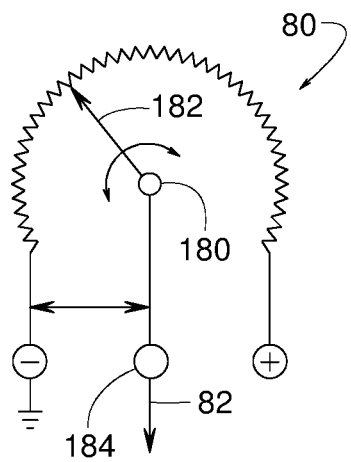
FIG. 16 is a schematic diagram of rotary potentiometer usable as a position sensor for a VAV valve.

FIG. 16, as mentioned earlier, is an example schematic illustration of position sensor 80 in the form of a rotational potentiometer. A central shaft 180 and wiper 182 rotate as a unit with lever arm 68 of VAV valve 12. In some examples, feedback signal 82 is provided at a central terminal 184.

Some examples of HVAC system 10 for conveying airflow 134 can be defined as follows:

Example-1 An HVAC system for conveying an airflow, the HVAC system comprising:

a VAV valve that includes a valve member movable within a valve housing that includes a curved funnel section;

an actuator system configured to move a position of the valve member within the valve housing to control the airflow through the VAV valve;

a position sensor operatively coupled to at least one of the actuator system and the valve member, the position sensor providing a feedback signal having a feedback value that varies in response to the position of valve member within the valve housing; and a computer readable medium having stored thereon, in a non-transitory state, a program code for use by a computing system, wherein the program code, when executed, causes the computing system to at least:

a) store a generic characterization for the VAV valve that generically characterizes the position of the valve member versus the airflow through the VAV valve between a minimum open position and a maximum open position of the VAV valve;

b) record a measured airflow at each of one or more positions of the valve member;

c) create a comparison by comparing the measured airflow at each of the one or more positions of the valve member with the generic characterization of the VAV valve;

d) determine a custom characterization for the VAV valve based on the comparison and the generic characterization of the VAV valve; and e) store the custom characterization for subsequent use by the VAV valve.

Example-2 The HVAC system of Example-1, wherein the actuator system comprises an actuator with a linkage connecting the actuator to the valve member, and the position sensor is a potentiometer coupled to the linkage.

Example-3 The HVAC system of Example-1, further comprising a spring disposed within the valve member and coupled to the actuator system.

Example-4 The HVAC system of Example-1, wherein the valve member, in response to a change in static pressure of the airflow, is movable relative to the curved funnel section over a limited range of movement while the feedback value remains substantially constant over the limited range of movement.

Example-5 The HVAC system of Example-1, further comprising an airflow measuring device for obtaining the measured airflow at each of one or more positions of the valve member.

Example-6 HVAC system of Example-1, wherein the program code, when executed, causes the computing system to further express the generic characterization on a logarithmic scale and to create the comparison by comparing the measured airflow at each of the one or more positions of the valve member with the generic characterization of the VAV valve while the generic characterization is in the logarithmic scale.

Example-7 The HVAC system of Example-6, wherein the logarithmic scale is in substantially a log base 10.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A method for characterizing a VAV valve that is configured to move a position of a valve member between a first open position and a second open position to control an airflow through the VAV valve, the method comprising:
   storing a generic characterization for the VAV valve that generically characterizes the position of the valve member versus the airflow through the VAV valve between the first open position and the second open position of the VAV valve;
   measuring the airflow at each of one or more positions of the valve member;
   applying a log base 10 to the measured airflow at each of the one or more positions of the valve member and applying a log base 10 to the generic characterization of the VAV valve;
   comparing the logarithm of the measured airflow at each of the one or more positions of the valve member with the corresponding logarithm of the generic characterization of the VAV valve;
   determining a custom characterization for the VAV valve based at least in part on the comparison;
   storing the custom characterization; and
   controlling an actuator, via a controller, to move the position of the valve member to a commanded position based at least in part on the custom characterization.

2. The method of claim 1, wherein the controller references the custom characterization to identify the commanded position of the valve member that achieves a commanded airflow through the VAV valve.

3. The method of claim 1, wherein comparing the measured airflow at each of the one or more positions of the valve member with the generic characterization of the VAV valve comprises comparing the measured airflow at each of the one or more positions of the valve member with a corresponding airflow at the same one or more positions of the valve member derived from the generic characterization of the VAV valve.

4. The method of claim 1, wherein the VAV valve has an approved operational airflow range extending between a first airflow and a second airflow, and wherein at least one of the one or more positions of the valve member at which the airflow is measured results in an airflow that is at or above the second airflow of the approved operational airflow range.

5. The method of claim 1, wherein the VAV valve has an approved operational airflow range extending between a first airflow and a second airflow, and wherein at least one of the one or more positions of the valve member at which the airflow is measured results in an airflow that is above a midpoint between the first airflow and the second airflow of the approved operational airflow range.

6. The method of claim 1, wherein the airflow is measured at only one position of the valve member.

7. The method of claim 1, wherein the airflow is measured at less than three positions of the valve member.

8. The method of claim 1, wherein the airflow is measured at less than five positions of the valve member.

9. The method of claim 1, wherein determining the custom characterization for the VAV valve comprises adjusting the generic characterization of the VAV valve from the first open position to the second open position based on the comparison.

10. The method of claim 9, wherein determining the custom characterization for the VAV valve comprises adjusting the generic characterization of the VAV valve more at the second open position than at the first open position.

11. The method of claim 10, wherein the VAV valve has an approved operational airflow range extending between a first airflow and a second airflow, wherein the first open position results in the first airflow and the second open position results in the second airflow.

12. The method of claim 10, wherein the VAV valve has an approved operational airflow range extending between a first airflow and a second airflow, wherein the first open position results in an airflow that is below the first airflow and the second open position results in an airflow that is above the second airflow.

13. A computer readable medium having stored thereon in a non-transitory state a program code for use by a computing system, the program code causing the computing system to execute a method for characterizing a VAV valve that has a valve member that is actuatable to control an airflow through the VAV valve, comprising:
   storing a generic characterization for the VAV valve that generically characterizes a position of the valve member versus the airflow through the VAV Valve;
   receiving a measure of airflow at each of one or more positions of the valve member;
   applying a logarithmic function to the measure of airflow at each of the one or more positions of the valve member, resulting in a logarithmic expression of the measure of airflow at each of the one or more positions of the valve member;
   applying the logarithmic function to the generic characterization of the VAV valve at each of the one or more positions of the valve member, resulting in a logarithmic expression of the generic characterization of the VAV valve at each of the one or more positions of the valve member;
   comparing the logarithmic expression of the measure of airflow at each of the one or more positions of the valve member with the logarithmic expression of the generic characterization of the VAV valve at each of the one or more positions of the valve member;
   determining a custom characterization for the VAV valve based at least in part on the comparison; and
   downloading the custom characterization to the VAV valve for subsequent use during operation of the VAV valve, wherein during subsequent use, the VAV valve references the custom characterization to identify a commanded position of the VAV Valve that achieves a commanded airflow through the VAV valve, and controls an actuator of the VAV Valve to move the VAV Valve to the commanded position.

14. The computer readable medium of claim 13, wherein the VAV valve has an approved operational airflow range extending between a first airflow and a second airflow, and wherein at least one of the one or more positions of the valve member that the measured airflow is received corresponds to a position of the valve member that results in an airflow that is above a mid-point between the first airflow and the second airflow of the approved operational airflow range.

15. The computer readable medium of claim 14, wherein at least one of the one or more positions of the valve member that the measured airflow is received corresponds to a position of the valve member that results in an airflow that is at or above the second airflow of the approved operational airflow range.

16. The computer readable medium of claim 13, wherein the one or more positions of the valve member at which a measure of airflow is received comprises less than three positions of the valve member.

17. The computer readable medium of claim 16, wherein the one or more positions of the valve member at which a measure of airflow is received comprises a single position of the valve member.

18. A system for characterizing a VAV valve that is configured to move a position of a valve member between a first open position and a second open position to control an airflow through the VAV valve, the system comprising:
 a memory for storing a generic characterization for the VAV valve that generically characterizes the position of the valve member versus the airflow through the VAV valve between the first open position and the second open position of the VAV valve;
 an airflow measuring device for measuring the airflow through the VAV valve;
 a controller operatively coupled to the memory and the airflow measuring device, the controller configured to:
  receive a measure of airflow from the airflow measuring device at each of one or more positions of the valve member;
  compare the received measure of airflow at each of the one or more positions of the valve member with the generic characterization of the VAV valve stored in the memory;
  determine a custom characterization for the VAV valve based on the comparison and the generic characterization of the VAV valve; and
  download the custom characterization to the VAV valve for subsequent use during operation of the VAV valve, wherein during subsequent use, the VAV valve references the custom characterization to identify a commanded position of the valve member that achieves a commanded airflow through the VAV valve, and controls an actuator of the VAV Valve to move the position of the valve member to the commanded position;
 wherein the VAV valve has an approved operational airflow range extending between a first airflow and a second airflow, and wherein at least one of the one or more positions of the valve member that the measured airflow is received corresponds to a position of the valve member that results an airflow that is above a mid-point between the first airflow and the second airflow of the approved operational airflow range, and wherein the one or more positions of the valve member at which a measure of airflow is received comprises less than four positions of the valve member.

19. The computer readable medium of claim 13, wherein the logarithmic function includes a log base 10 function.

* * * * *